United States Patent [19]
Peterson

[11] Patent Number: 5,755,454
[45] Date of Patent: May 26, 1998

[54] TOWING SYSTEM FOR A VEHICLE

[75] Inventor: Jeffrey M. Peterson, Milwaukie, Oreg.

[73] Assignee: Jerry A. Edwards, Portland, Oreg.

[21] Appl. No.: 661,060

[22] Filed: Jun. 10, 1996

[51] Int. Cl.$^6$ ............................................. B60D 1/14
[52] U.S. Cl. ............................................. 280/491.001
[58] Field of Search ............................. 280/495, 502, 280/500, 402, 505, 491.3, 498, 507, 493

[56] References Cited

U.S. PATENT DOCUMENTS

| | | | |
|---|---|---|---|
| 2,747,892 | 5/1956 | Jones | 280/501 |
| 2,797,107 | 6/1957 | Bernard et al. | 280/501 |
| 3,547,469 | 12/1970 | Sancioni | 280/500 |

FOREIGN PATENT DOCUMENTS

| | | | |
|---|---|---|---|
| 4104671 | 12/1992 | Germany | 280/495 |

*Primary Examiner*—Ed L. Swinehart
*Attorney, Agent, or Firm*—Robert L. Harrington

[57] ABSTRACT

A towing system for a vehicle particularly suited for a vehicle having an energy absorbing feature. The towing system has a frame bracket mounted to a frame member and bumper bracket, e.g., mounted to a bumper or bumper strut. The frame bracket and bumper brackets are mounted strategic one to the other and in a paired relation. The brackets are mounted at determined positions so that the energy absorbing feature of the vehicle is not compromised. A draw tube is removably mountable in each bracket pair. The draw tube is installed for the mounting of a tow bar and is removed to restore the energy absorbing feature of the vehicle.

10 Claims, 2 Drawing Sheets

TOWING SYSTEM FOR A VEHICLE

FIELD OF THE INVENTION

This invention relates to tow bars for vehicles and more particularly relates to a towing system for vehicles having energy absorbing structure.

BACKGROUND INFORMATION

Currently it is common for one vehicle to be towing another vehicle. For example owners of motor homes that travel any distance from their home base frequently tow another vehicle such as an automobile behind their motor home. The automobile which is towed by the motor home has a tow bar mounted on the front end and is connectable to a hitch on the motor home. The owner of the motor home thus will have an auxiliary vehicle to use when they reach a destination.

Many modern vehicles now are designed with frame work that is designed to collapse in the event of collision to absorb the high energy experienced during an impact or front end collision. Tow bars in common use utilize rigid structure mounted to the vehicle's frame work that interferes and diminishes the collapsing capability of the frame work of the vehicle.

It is accordingly an objective of the present invention to provide a towing system that will not interfere or diminish the energy absorbing capability of the front end of the vehicle.

BRIEF SUMMARY OF THE INVENTION

A preferred embodiment of the present invention has a first set of brackets strategically positioned on frame members on each side of the vehicle and behind the front end bumper. Another set of brackets is mounted in spaced relation to the front set of brackets such as on the bumper or bumper struts (hereafter referred to as bumper or front brackets). A frame bracket and a bumper bracket form a bracket pair and each bracket pair is arranged for the removable mounting of a draw tube. A draw tube is readily inserted in each pair of brackets to engage each bracket of the pair and is secured by a simple retainer. The front end of the draw tube of each bracket pair protrudes from the bumper and is configured for mounting a tow bar. A conventional tow bar is mounted to the protruding ends of the draw tubes permitting the vehicle to be connected to a towing hitch of a towing vehicle. The strategic placement of the frame member brackets and the front brackets does not interfere with the energy absorbing structure of the vehicle.

BRIEF DESCRIPTION OF THE DRAWINGS

FIGS. 4 and 5 are views illustrating the manner of installing a draw tube in the bracket pair of FIG. 2.

DESCRIPTION OF THE PREFERRED EMBODIMENT

Figure 6:
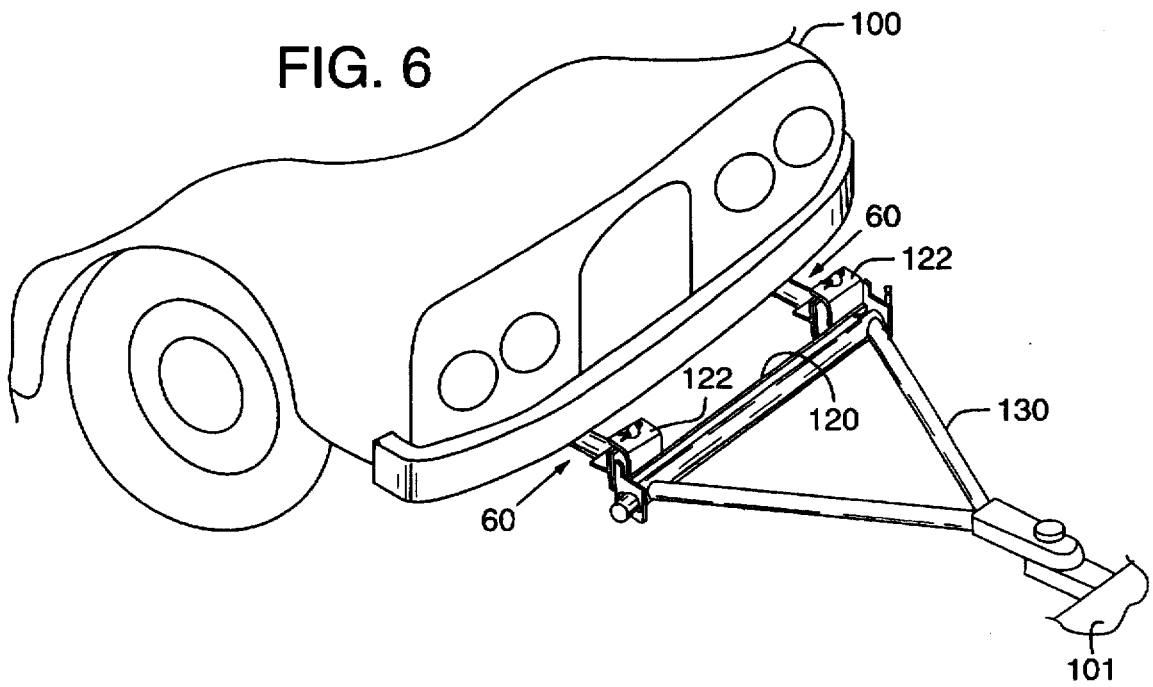
FIG. 6 is a view of the towing package mounted to a vehicle.

Referring first to FIG. 6, illustrated is the rear end of a towing vehicle 101 towing a towed vehicle 100 using a tow bar assembly 130. It will be appreciated that, e.g., in the case of a motor home towing a car, the pulling and stopping force is derived from the towing vehicle transmitted to the towed vehicle via the tow bar assembly. The connection of the tow bar assembly to the vehicle must be a strong and secure connection preferably to the vehicle frame.

Figure 1:
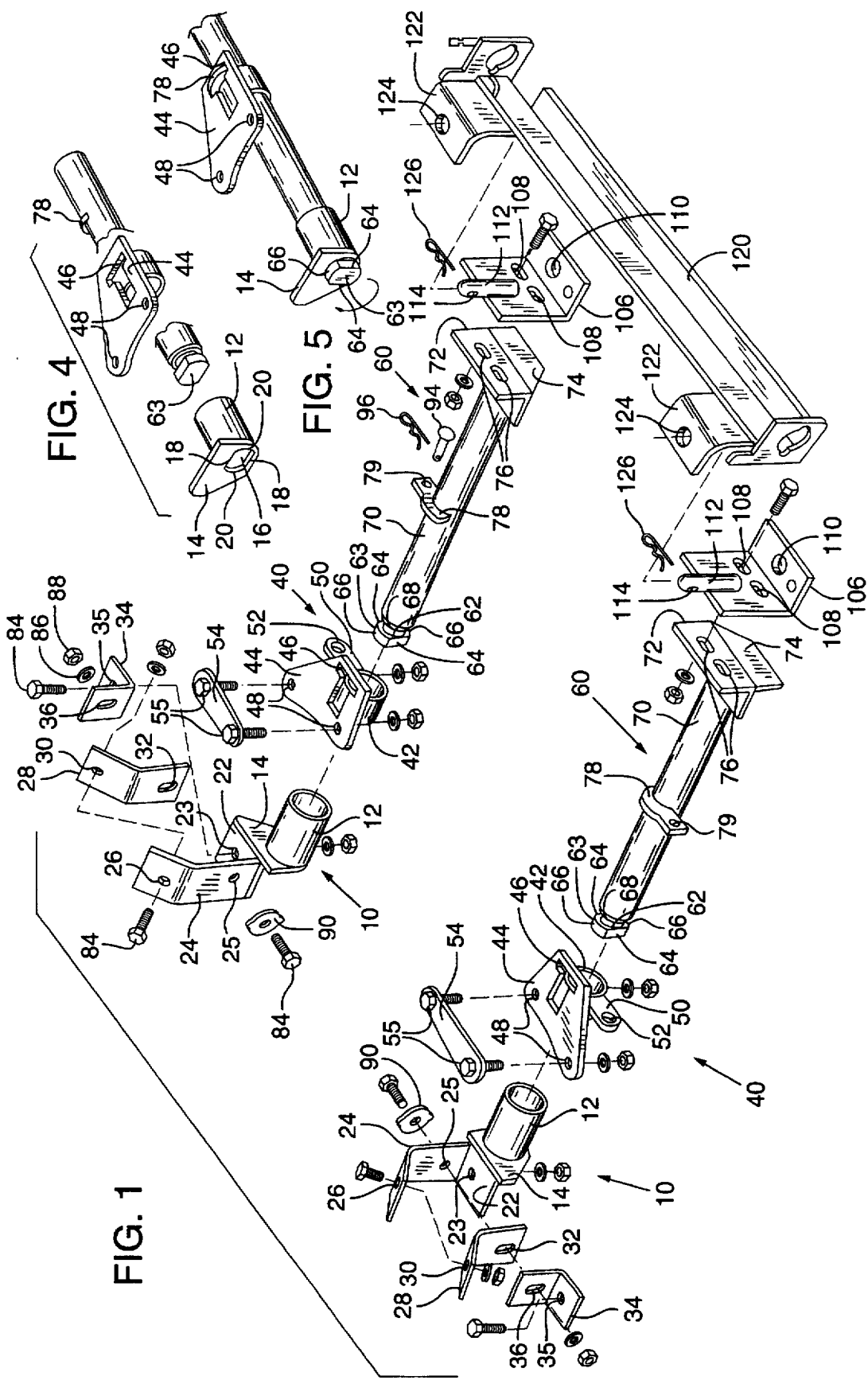
FIG. 1 is an exploded view of the towing system of the present invention.

Refer now to FIG. 1 of the drawings which illustrates in exploded view a towing system of the present invention for a vehicle. The towing system has frame brackets 10 (sometimes referred to as rear brackets) that are configured to be mounted to a point or position on the frame spaced rearwardly from the front end of a vehicle. The frame bracket 10 has a cylindrical portion 12 that has an end plate 14 fixedly mounted to the end of the cylinder portion 12.

The end plate 14 has a configured opening 16 (best seen in FIG. 4). The opening 16 is of a semi-rectangular formation having parallel sides 18 and opposed arcuate ends 20 that extend from the sides 18. A base plate 22 is fixedly mounted to the end plate 14 (removed from end plate 22 in FIGS. 4 and 5) with the base plate 22 being substantially normal to the end plate 14. An aperture 23 is provided in the base plate 22.

An angle plate 24 extends from one end of the base plate 22 and as shown in the figure, the angle plate 24 is bent into somewhat of an L-shape. An aperture 25 is provided in one of the legs of the angle plate 24 and an aperture 26 is provided in the other leg of the angle plate 24. It will be appreciated that the base plate 22 and the angle plate 24 may be formed as a single unit.

The frame bracket 10 includes an angled filler plate 28 that is configured substantially in the same manner as the angle plate 24. The angled filler plate 28 has an aperture 30 in one leg and has a slot 32 in the other leg. The frame bracket 10 also includes a right angled filler plate 34 that has a slot 36 in its one leg and an aperture 35 in the other leg.

The frame bracket 10 is configured to fit the profile of the frame member of a vehicle. It will be appreciated that the base plate 22 and the angle plate 24 along with the filler plates 28, 34 may vary from the example as illustrated and will be configured to suit the frame member of a particular vehicle.

The towing system has front brackets 40 that are mountable to a cross member such as a bumper of a vehicle. The front bracket 40 has a cylindrical portion 42. A support plate 44 is mounted to the periphery of the cylindrical portion 42. The support plate 44 has a configured opening such as a formed slot 46 and is provided with apertures 48. As shown in the figure, the slot 46 is positioned strategic to one end of the cylindrical portion 42 of the bracket 40. A locking dog 50 extends from the cylindrical portion 42 strategic to the slot 46 and the locking dog 50 extends substantially normal to the cylindrical portion 42. The locking dog 50 is fixedly attached to the cylindrical portion 42 and the support plate 44. The locking dog 50 is provided with an aperture 52. A spacer bar 54 is provided for the bracket 40 and is utilized during the mounting of the bracket 40 to the bumper or bumper supports (struts) of a vehicle. The spacer bar 54 has apertures 55 that are alignable with the apertures 48 in the support plate 44.

The frame bracket 10 and the front bracket 40 are mounted in a paired relationship on the vehicle, that is one frame or rear bracket 10 is paired with one bumper or front bracket 40. The bracket 40 is mounted to be strategically aligned with the paired frame bracket 10. The cylindrical portion 12 of the frame bracket 10 and the cylindrical portion 42 of the front bracket 40 are axially aligned when installed on the vehicle.

The towing system further includes a draw tube 60 that is removably installable in the paired frame bracket 10 and the front bracket 40. (Draw tube as used herein applies to an elongated rigid member that transmits a drawing force to the brackets and does not necessarily refer to a cylindrical member or a member having a center cavity.) The draw tube 60 has a configured end 62 that is fixedly attached to an end of a cylindrical portion 70 of the draw tube 60. A portion 63 of the formed end 62 is configured in the same manner as the opening 16 in the end plate 14 of the frame bracket 10. The formed end 62 has parallel sides 64 that correspond to the parallel sides 18 of the opening 16 and further has arcuate ends 66 that correspond to the arcuate ends 20 of the opening 16 in the end plate 14. A peripheral groove 68 is provided adjacent the portion 63 of the formed end 62 of the draw tube 60. The base of the groove 68 has a diameter that is substantially equal to the distance between the parallel sides 64.

An angled end plate 72 is mounted to the opposite end of the cylindrical portion 70 of the draw tube 60. The angled end plate 72 is fixedly mounted to the end of cylindrical portion 70 and is further supported by a reinforcing plate 74 that is in turn fixedly mounted to the angled end plate 72 and the end of the cylindrical portion 70 of the draw tube 60. The angled end plate 72 is provided with elongate slots 76.

In this embodiment the angled end plate 72 is configured to mount conventional tow bar brackets 106. The brackets 106 are right angle brackets that have slots 108 provided in one leg and an aperture 110 in the other leg. A post 112 is fixedly attached to the leg that has the slots 108. The post 112 has a cross bore 114 near its upper end. A bracket 106 is fixedly attached to each of the angled end plate 72 of the draw tubes 60 by conventional fasteners such as bolts 84, nuts 88 and washers 86.

The brackets 106 attached to the draw tubes 60 are arranged for the quick mounting and removal of a tow bar beam 120 of a tow bar assembly (see FIG. 1). The beam 120 has angle brackets 122 that have apertures 124. The beams 120 are mounted at a strategic distance from each other to be mountable on the brackets 106 when the draw tubes 60 are mounted to a vehicle. The apertures 124 of the beam 120 receive the posts 112 and the aperture 110 in the bracket 106 receives another pin extending from the beam 120 (out of view). The beam 120 is secured in position by a fastener such as pins 126 inserted in the cross bores 114 of the posts 112. A tow bar of the two bar assembly 130 (see FIG. 6) is mounted to the beam 120 in a conventional manner.

A locking cam 78 is fixedly mounted on the periphery of cylindrical portion 70 of the draw tube 60. The locking cam 78 is at a strategic distance from the groove 68 and is radially positioned strategic to the portion 63 of end 62. The locking cam 78 has an aperture 79.

FIG. 1 illustrates two frame (rear) brackets 10, two bumper (front) brackets 40 and two draw tubes 60. One set of a frame bracket 10, a bumper bracket 40 and a draw tube 60 are arranged to be mounted on one side of a vehicle and the other set is arranged to be mounted on the other side of the vehicle. AS will later be explained the frame brackets 10 are mounted to a frame member of the vehicle and the bumper brackets 40 are mounted to the bumper or bumper struts of the vehicle. Each draw tube 60 is removably installed in a paired frame bracket 10 and bumper bracket 40.

Figure 2:
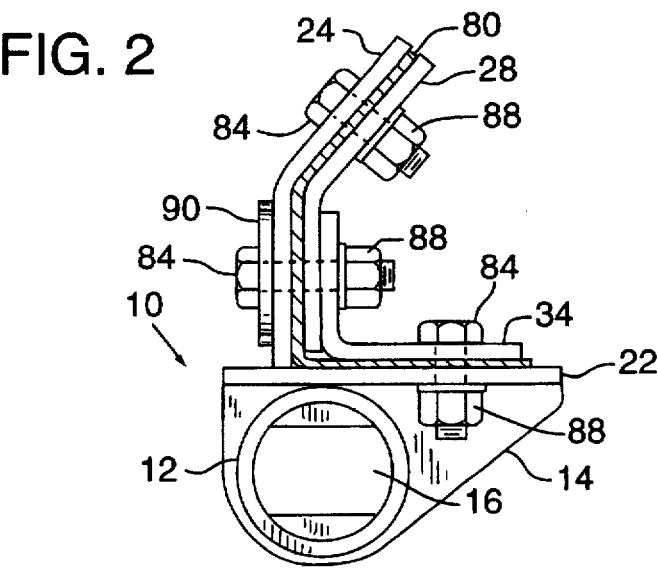
FIGS. 2 and 3 are views of frame brackets and bumper brackets of the towing package of FIG. 1 mounted on a vehicle.
Figure 3:
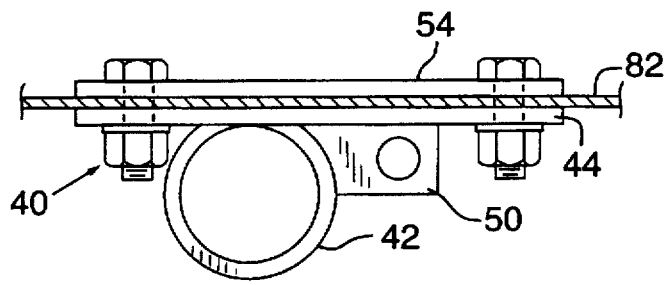

Refer now to FIGS. 2 and 3 of the drawings which illustrates the manner of installing the frame bracket 10 to a frame member 80 and the manner of installing the bumper bracket 40 to a bumper strut 82. In this embodiment, frame member 80 refers to both the left frame member and right frame member of the vehicle.

The frame bracket 10 (FIG. 2) is fitted to the frame member 80 with the base plate 22 and the angle plate 24 basically surrounding the frame member 80. The angled filler plate 28 is fitted to the frame member 80 on the side opposite the angle plate 24. An aperture (out of view in the figure) provided in the frame member 80 will be aligned with the aperture 26 in the angle plate 24 and the aperture 30 in the angle plate 28. A fastener 84, such as a bolt, is inserted into the aligned apertures of the frame member 80, angle plate 24 and the angled filler plate 28 and is secured by a lock washer 86 and a nut 88. The angle plate 34 is fitted against the filler plate 28 with the slot 36 align ed with the slot 32 of the angle plate 28 and is further aligned with the aperture in the frame member 80 (out of view) and the aperture 25 of the angle plate 24 of the bracket 10. Another fastener 84 to which a reinforcing was her 90 has been installed is inserted into the aligned apertures 26, 30, 36, aperture in frame member 80 and is secured by a lock washer 86 and nut 88. A slot 35 of the angle plate 34 will be aligned with an aperture 23 in the base plate 22 and an aperture provided in the frame member 80. The angle plate 34 is secured to the frame member 80 and the base plate 22 by another fastener 84 inserted into the aligned apertures 23, 35 including the aperture in the frame member 80 and again being secured by a lock washer 86 and a nut 88. The frame bracket 10 is thus securely mounted to the frame member 80 of the vehicle.

As previously mentioned, the bumper bracket 40 is mounted to a bumper 82 extending between the frame members 80 of the vehicle as shown in FIG. 3. The base plate 44 of the bumper bracket 40 is mounted on the under side of the bumper 82 extending between the frame members 80. The reinforcing plate or bar 54 is placed on top of the bumper 82 and thus the bumper 82 of the vehicle is received between the base plate 44 and the spacer plate 54. The bumper bracket 40 is secured to the bumper 82 by fasteners 84 extending through apertures 55 of the reinforcing bar 54 and apertures provided in the bumper 82 with the fasteners 84 extending through the apertures 48 provided in the base plate 44 of the bumper bracket 40. The fasteners 84 are secured in position by lock washers 86 and nuts 88. The bumper bracket 40 is thus fixedly attached to the bumper 82 of the vehicle which extends between the cross members 80.

The frame bracket 10 and the bumper bracket 40 are mounted in pairs with one frame bracket 10 being mounted to a frame member 80 and a bumper bracket 40 being mounted strategic to the frame bracket 10 and being fixedly attached to the bumper 82 that extends between the frame members 80. Similarly the other frame bracket 10 and bumper bracket 40 will be mounted to the other frame member 80 and to the bumper 82 extending between the frame members 80. The cylindrical portion 12 of the frame bracket 10 and the cylindrical portion 42 of the bumper bracket 40 when in the installed paired position will be axially aligned.

Refer now to FIGS. 4 and 5 of the drawings which illustrates the manner of inserting the draw tube 60 into the bracket pair 10, 40. The end 62 of the draw tube 60 is initially inserted through the cylindrical portion 42 of the bumper bracket 40. The draw tube 60 is rotated as it is inserted into the cylindrical portion 12 of the frame bracket 10 such that the formed portion 63 of the end 62 is aligned with the opening 16 in the end plate 14 of the frame bracket 10 and the locking cam 78 is clear of the end of the base plate 44. This permits the end portion 63 of the end 62 to be inserted through the opening 16 in the end plate 14 and positions the groove 68 strategic to the parallel sides 18 of the opening 16.

The draw tube 60 is then rotated such that the arcuate ends 66 on the formed portion 63 on the end 62 will come into contact with the end plate 14 adjacent the sides 18 of the opening 16. The end plate 14 is in effect received in the groove 68 in the end 62 of the draw tube 60. As the draw tube 60 is rotated, the locking cam 78 positioned on the cylindrical portion 70 of the draw tube 60 will be received in the slot 46 of the base plate 44 of the bumper bracket 40. The aperture 79 of the locking cam 78 will be aligned with the aperture 52 in the locking dog 50 of the bumper bracket 40. A pin 94 is inserted into the aligned apertures 79, 52 to secure the cam 78 to the dog 50 to thus secure the draw tube 60 in its installed position. The pin 94 is secured in the installed position by a clip 96. Another draw tube 60 is similarly installed into the other paired brackets 10, 40.

The draw tube 60 may also be secured in its installed position by safety cables or safety chains that will extend to the towing vehicle as a safety device. The end of the safety cable or safety chain is configured to be inserted and retained in the aligned apertures 79, 52 to secure the draw tube 60 in position.

FIG. 6 illustrates a vehicle 100 to which the towing system of the present invention has been installed. The frame brackets 10 have been installed on the frame members 80 and the bumper brackets 40 have been installed on the bumper 82 of the vehicle 100 as previously mentioned. The draw tube assembly 60 with a bracket 106 installed thereon has been inserted and secured in place in each of the bracket pairs 10, 40 and a tow bar assembly 130 has been fitted and secured to the draw tube assemblies 60. The vehicle 100 is thus ready to be towed by another vehicle 101.

When the vehicle 100 is not to be towed, the tow bar assembly 130 is detached from the brackets 106 of draw tubes 60 and each of the draw tubes 60 is removed from the bracket pairs 10, 40. When the draw tubes 60 have been removed, the energy absorbing feature of the vehicle 100 is again restored to its original concept. As previously mentioned, the frame brackets 10 and the bumper brackets 40 are strategically mounted such that they will not interfere or diminish the collapsing feature of the frame of the vehicle 100.

The draw tubes 60 are arranged such that the draw tube is in engagement with both the frame member bracket 10 and the bumper bracket 40. Each of the brackets 10, 40 will thus bear the load that is imparted by the draw tube 60 when the vehicle 100 is being towed by another vehicle. The formed portion 63 and the groove 68 on end 62 of the draw tube 60 is in engagement with the end plate 14 of the frame bracket 10 and the locking cam 78 is in engagement with the base plate 44 of the bumper bracket 40 by the cam member 78 fitting in the slot 46 of the base plate 44.

The above disclosure provides a structure that enables the mounting of a tow bar to a vehicle that is designed to be resistively collapsible (absorbing energy and thereby reducing the risk of energy) without interfering with that collapsibility. What is not provided is a precise teaching of exactly where on the vehicle (or its frame) the spaced apart brackets are to be placed. Each vehicle, based on many factors, is specifically designed and a particular bracket applied to a particular position on one frame will not be correct for another. Each vehicle designer is able to compute a desired bracket configuration and position(s) that is acceptable for that vehicle's frame. The present invention will adapt to most or all such vehicles. Once a bracket configuration and location is established which will not interfere with collapsibility of the frame, the present invention teaches how to use the bracket for mounting a tow bar assembly, i.e., an assembly which, having a removable draw tube, avoids the undesired interference.

Those skilled in the art will recognize that modifications and variations may be made without departing from the true spirit and scope of the invention. The invention is, therefore, not to be limited to the embodiments described and illustrated but is to be determined from the appended claims.

What is claimed is:

1. A method of mounting a tow bar assembly to a vehicle movable in a determined forward direction and having a body and a frame combination that is designed to be resistively collapsible in the event of an impact, said method comprising:

identifying a pair of spaced apart locations on the vehicle defining rear and front locations at each side of a longitudinal center line of the vehicle whereat a pair of rear and front brackets can be mounted without interfering with the ability of the vehicle to collapse upon impact;

providing said rear and front brackets of each pair of brackets with a releasable attachment feature;

attaching said brackets at the spaced apart locations on the vehicle and providing a pair of draw tubes having attachment features mated to the releasable attachment features of the brackets for removable mounting of a draw tube of said pair of draw tubes to each of the pair of brackets whereby an end of each draw tube is fixedly exposed at the front end of the vehicle; and providing said exposed front ends of the draw tubes with a tow bar structure for towing engagement with a towing vehicle, said draw tubes and said tow bar structure being removable to retain the collapsible features with the vehicle in a driving condition.

2. A method as defined in claim 1 including removably attaching said tow bar structure to said exposed front ends of the draw tubes and preventing removal of said draw tubes from said brackets with the tow bar structure attached to said exposed ends.

3. A method as defined in claim 2 including rotatably locking and unlocking said draw tubes to both of said brackets of said pair of brackets and preventing rotatably unlocking said draw tubes upon attachment of said tow bar structure to the exposed ends of said draw tubes.

4. A towing assembly for a vehicle movable in a determined forward direction and having a body and frame resistively collapsible in the event of impact and including designated positions whereat brackets can be attached without interfering with the collapsible capability of the body and frame, said assembly comprising:

brackets configured for front to back spaced apart attachment to the vehicle, a pair of said brackets mounted at each side of a longitudinal center line of the vehicle, said brackets configured for attachment to said designated positions on the frame and thereby avoiding interference with the vehicle's collapsibility;

each of said brackets in each of said pair of brackets having releasable attachment features and a draw tube mountable to each pair of brackets and having releasable attachment features mated to the releasable attachment features of said brackets and coinciding with the spaced apart positions of said brackets when mounted to the vehicle; and said draw tubes having exposed front ends and a tow bar structure attached to said exposed front ends of said draw tubes.

5. A towing assembly as defined in claim 4 wherein said tow bar structure is removably attached to said exposed ends.

6. A towing assembly as defined in claim 4 wherein the draw tubes are attachable to said brackets by rotation of said draw tubes relative to said brackets, said attachment of the tow bar structure to the exposed ends of the draw tubes preventing rotation of the draw tubes and thereby preventing removal of said draw tubes from the brackets.

7. A vehicle having an energy absorbing feature and a towing system for said vehicle, comprising:

a frame member and a body member mounted to the frame member of the vehicle and a bumper having a cross member;

a frame bracket mounted to the frame member;

a front bracket mounted to the cross member;

said frame bracket and said front bracket mounted strategic one to the other to avoid interference with the energy absorbing feature and defining a bracket pair;

a rigid draw tube removably mounted to the bracket pair and when mounted providing a rigid attachment between said brackets; and a tow bar assembly removably mountable to the draw tube when said draw tube is installed in said bracket pair and preventing removal of said draw tube, and said energy absorbing feature restored when said tow bar assembly and the draw tube is removed from said bracket pair.

8. A vehicle having a towing system comprising:

a frame member;

a frame bracket mounted to the frame member;

a cross member forward of the frame bracket;

a cross member bracket mounted to the cross member;

said frame bracket and said cross member bracket mounted strategic one to the other and defining a bracket pair;

a draw tube removably mounted to the bracket pair;

a tow bar assembly mounted to the draw tube when said draw tube is mounted to said bracket pair;

said frame bracket having a configured opening;

said draw tube having a configured end mating said opening in said frame bracket;

whereby said end of said draw tube is insertable through said configured opening in said frame bracket and rotatable to engage said frame bracket.

9. A towing system as defined in claim 8 wherein:

said cross member bracket has a configured opening;

said draw tube has a cam;

said draw tube rotatable to engage said cam with the configured opening in said cross member bracket to engage said draw tube with said cross member bracket.

10. A towing system as defined in claim 9 wherein:

said cross member bracket includes a dog;

said cam securable to said dog to secure said draw tube in said bracket pair.

* * * * *